3,044,958
CORROSION INHIBITION
Raymond A. Newsom, Cedar Rapids, Iowa, assignor to The Dow Chemical Company, Midland, Mich., a corporation of Delaware
No Drawing. Filed Apr. 18, 1958, Ser. No. 729,243
4 Claims. (Cl. 252—8.55)

The present invention relates to corrosion inhibition and more particularly to a new and useful class of compounds which inhibit the corrosion of metallic surfaces in contact with non-oxidizing mineral acids and/or the lower alkyl carboxylic acids.

Many of the known better and effective inhibitors for the prevention of the corrosion of metals in contact with acids are expensive materials. Further, many of these materials exhibit a high toxic effect which necessitates special handling by skilled crews. The art, therefore, has long sought an inexpensive, safe organic compound for use as an acid-corrosion inhibitor.

It has now been found that the reaction product of 1,3-dichloropropene with an alkali metal or ammonium salt of hydrosulfuric acid, i.e., sulfides and/or hydrosulfides, is an effective and inexpensive corrosion inhibitor under acid conditions. The product conveniently may be prepared by reacting 1,3-dichloropropene with a salt of hydrosulfuric acid such as sodium, potassium, lithium or ammonium sulfide or hydrosulfide, dissolved in an inert organic solvent, such as methanol, ethanol, isopropanol, acetone, or aqueous solutions or mixtures thereof. The reaction is conducted by contacting the reactants in a portionwise manner and at a temperature of from about 60° C. to about 140° C. If the hydrosulfide is employed, the reaction mixture is treated with caustic and heated at from 60° to 140° C. for an additional period of time to complete the reaction. Upon completion of the reaction, the reaction product is separated by addition of water to the reaction mixture and acidification to precipitate a homogeneous dark colored liquid which may be fractionated to separate the product as a distillation residue at 0.1–0.2 mm. pressure at 40° C.

Various solvents may be employed in the preparation of the inhibitor of the present invention, thus, generally, water or any lower alcohol, lower ketone, mixtures thereof or aqueous solutions thereof may be employed. Thus, methanol, ethanol, propanol, isopropanol, butanol, acetone, methyl ethyl ketone, water, mixtures thereof or aqueous solutions thereof are operable. The solvent is employed in an amount sufficient to at least partially solubilize both reactants. Thus, from 50 to 500 ml. of solvent per mole of 1,3-dichloropropene are preferably employed to insure adequate intimate contact of the reactants.

The reactants, 1,3-dichloropropene and salt of hydrosulfuric acid, are reacted in a ratio of from 0.25 to 1.5 moles of salt per mole of dichloropropene. Preferably the ratio of reactants is from 0.5 to 1.25 moles of salt per mole of dichloropropene.

Various salts of hydrosulfuric acid may be employed as the reactant. Thus, the alkali metal sulfides, such as sodium sulfide, sodium hydrosulfide, potassium sulfide, potassium hydrosulfide, lithium sulfide, lithium hydrosulfide, and the like, and ammonium sulfide or ammonium hydrosulfide may be employed. It is to be understood that when the hydrosulfide is employed, the reaction mixture must subsequently be treated with an alkali metal hydroxide.

The reaction time may vary considerably. However, it has been found that, generally, at least two hours are necessary to obtain a sufficient portion of the desired reaction product, and preferably at least from 3 to 10 hours. Periods as long as 18 hours did not materially deteriorate the product but likewise did not materially increase the yield. Times such in excess of 18 hours were were found to decompose the product.

The product of the present invention is employed in amounts of from about 0.05 percent to 1.2 percent by volume of the aqueous acid to be inhibited. Generally it is preferred to employ from about 0.1 percent to 0.8 percent by volume.

In accordance with the present invention, it is desirable to employ a dispersing agent such as an ionic or non-ionic surfactant. Thus, for example, one can employ a condensation product derived by condensing nonylphenol with about 15 to 30 moles of ethylene oxide; ammonium benzene-para-sulfonate; sodium 2-methyl-7-ethyl-4-hendecyl sulfate; or, trimethylstearylammonium chloride; and, the like.

The following examples are illustrative of the present invention but are not to be construed as limiting.

EXAMPLE 1

307.6 grams (400 ml.) of ethanol is placed in a three-necked 1-liter flask. To this solvent is added 130 grams of 60 percent sodium sulfide (1 mole). The flask is equipped with a reflux condenser and a glass-shafted stirrer having a 2.5 inch diameter, crescent shaped Teflon stirrer blade. The mixture is heated to reflux (78.5° C.) by a heating jacket, after which 111 grams of 1,3-dichloropropene (1 mole) is added dropwise over a period of 25 minutes. Heating is continued for an additional 1 hour and 35 minutes. Twenty grams (0.5 mole) of sodium hydroxide is added and the mixture refluxed for an additional 1.5 hours. To separate the reaction product from the solvent, two liters of water are added. The mixture is acidified by adding concentrated hydrochloric acid (approximately 20 grams required). The solvent enters the water phase and the reaction product separates. The reaction product, a homogeneous dark colored liquid, may be used as such or may be fractionated. The reaction product is partially distilled by passing it three times through a falling-film still at a pressure of 0.1 to 2 mm. with methylene chloride vapors as the source of heat (40.2° C.). The fraction distilling off, comprising about 50 percent of the total, has been identified as bis(chloroallyl) sulfide, a poor inhibitor. The residue, about 50 percent of the original material, is the desired inhibitor.

EXAMPLE 2

An inhibitor composition was prepared by mixing equal volumes of the above described product and a non-ionic surfactant consisting of nonylphenol condensed with 30 moles of ethylene oxide. From this formulation an inhibited 15 percent aqueous solution of hydrochloric acid may be prepared by adding 628 gallons of water to a 1000 gallon tank, then adding 4 gallons of the above prepared inhibitor formulation and agitating the mixture with an air lance. Thereafter while continuing the agitation, 368 gallons of 36.5 to 38.0 percent hydrochloric acid is added and agitation continued for approximately 15 minutes. This hydrochloric acid composition is suitable for use in acidizing oil wells or in cleaning industrial equipment.

General Procedure for Corrosion Rate Determination

Corrosion rate determinations were made under two sets of conditions depending on the metal used. The two metals used in these evaluations were AISI 1010 mild steel rectangular coupons 2.75" x 1" x 0.125" and API N80 steel specimens which were 1 inch quarter segments of 2.375" outside diameter pipe having a wall thickness of 0.187".

The inhibitor composition to be tested was added at a concentration of 0.4 percent to 150 ml. of aqueous 15 percent hydrochloric acid. The inhibited acid solution was preheated to the test temperature, 93° C. (200° F.) if AISI 1010 specimens were to be used or 79° C. (175°

F.) if API N80 specimens were to be employed. The weighed metal coupon was introduced into the solution and exposed for 16 hours. After this time the coupon was removed from the test solution, scrubbed with a toothbrush using soap and water, dried in acetone and reweighed. The weight loss of the coupon was used to calculate the corrosion rate of the particular system in units of lbs./ft.²/day. The corrosion rate determinations of the following examples were conducted in accordance with the above procedures.

EXAMPLE 3

Crude and distilled dichloropropene and various sulfides were employed in the manner of Example 1 to prepare reaction products which gave inhibitor action.

| Dichloropropene (mole) | Sulfide Material Moles | Corrosion Rate (lbs./ft.²/day) | |
|---|---|---|---|
| | | API N80 | AISI 1010 |
| 111 g. (1.0) (distilled) | 130 g. 60 percent Sodium Sulfide (1.0). | 0.12 | 0.019 |
| 111 g. (1.0) (crude) | 130 g. 60 percent Sodium Sulfide (1.0). | 0.12 | 0.019 |
| 111 g. (1.0) (crude) | 80 g. 70 percent Sodium Hydrosulfide (1.0). | 0.074 | 0.0068 |
| 111 g. (1.0) (crude) | 160 g. 70 percent Sodium Hydrosulfide (2.0). | 0.48 | 0.039 |

EXAMPLE 4

To determine the suitable molar ratios of sodium sulfide to dichloropropene, products were prepared in which varying ratios were used.

| Mole Ratio Sodium Sulfide/Dichloropropene | Corrosion Rate (lbs./ft.²/day) | |
|---|---|---|
| | API N80 | AISI 1010 |
| 0.25:1 | 1.0 | 0.044 |
| 0.5:1 | 0.58 | 0.019 |
| 0.75:1 | 0.69 | 0.023 |
| 1:1 | 0.13 | 0.019 |
| 1.5:1 | 0.12 | 0.019 |
| 2.0:1 | 0.12 | 0.017 |

EXAMPLE 5

The inhibitor of the instant invention may be utilized in several forms. The reaction product prior to distillation is an inhibitor but a relatively large volume must be used since this material contains about 50 percent of bis(3-chloroallyl) sulfide which does not function satisfactorily as an inhibitor. The portion of the reaction product that is an inhibitor may be separated by distilling off the bis(3-chloroallyl) sulfide using either a falling-film still or an ordinary vacuum still. Corrosion rates with various formulations are shown below:

| Inhibitor Composition (percent by volume) | Corrosion Rate (lbs./ft.²/day), AISI 1010 |
|---|---|
| 0.4 percent reaction product [1] | 0.098 |
| 0.8 percent reaction product | 0.045 |
| 0.4 percent reaction product (distillation residue using falling film still) (A) | 0.040 |
| 0.4 percent reaction product (distillation residue using vacuum distillation) (B) | 0.047 |
| 0.4 percent formulation 1:1 mixture of product A+nonylphenol condensed with 30 moles ethylene oxide (nonionic surfactant) | 0.019 |
| 0.4 percent formulation 1:1 mixture of product A+nonylphenol condensed with 15 moles ethylene oxide (nonionic) | 0.021 |
| 0.4 percent formulation of 1:1 mixture of product A+ammonium benzene-para-sulfonate (anionic) | 0.035 |
| 0.4 percent formulation of 1:1 mixture of product A+sodium 2-methyl-7-ethyl-4-hendecyl sulfate (anionic) | 0.032 |
| 0.4 percent formulation of 1:1 mixture of product A+trimethyloleylammonium chloride (cationic) | 0.037 |
| 0.4 percent formulation of 1:1 mixture of product A+trimethylstearylammonium chloride (cationic) | 0.035 |

[1] Derived in the manner of Example 1.

EXAMPLE 6

The following tests were made to show the effectiveness of the inhibitor in other non-oxidizing mineral acids and organic acids.

| Acid Media | Concentration Inhibitor (percent by volume) | Temperature (° F.) | Corrosion Rate (lbs./ft.²/day), AISI 1010 |
|---|---|---|---|
| 10 percent hydrochloric | None | 200 | >1.0 |
| 10 percent hydrochloric | 0.4 | 200 | 0.019 |
| 5 percent sulfuric | None | 175 | 0.23 |
| 5 percent sulfuric | 0.4 | 175 | 0.0017 |
| 5 percent phosphoric | None | 175 | 0.089 |
| 5 percent phosphoric | 0.4 | 175 | 0.0044 |
| 5 percent acetic | None | 175 | 0.18 |
| 5 percent acetic | 0.4 | 175 | 0.0017 |

EXAMPLE 7

The following tests were made to show the effectiveness of the inhibitor composition in 10 percent hydrochloric acid at 175° F. on various steels.

| Concentration Inhibitor (percent by volume) | Steel | Corrosion Rate (lbs./ft.²/day) |
|---|---|---|
| None | AISI 1010 | >1.0 |
| 0.4 | AISI 1010 | 0.019 |
| None | AISI 1020 | >1.0 |
| 0.4 | AISI 1020 | 0.031 |
| None | AISI 304 | 0.015 |
| 0.4 | AISI 304 | 0.0097 |
| None | API J55 | >1.0 |
| 0.4 | API J55 | 0.083 |
| None | API N80 | >1.0 |
| 0.4 | API N80 | 0.12 |

As was stated previously, the exact composition of the reaction product has not been determined. Elemental analysis, infrared spectra, mass spectra, molecular weight determination and unsaturation tests show that the product is a mixture of compounds, at least part of which are unsaturated, whose average general formula is $$C_{12}H_{16}S_3Cl_2$$

I claim:

1. A composition for use in inhibiting the corrosion of metals in contact with an aqueous non-oxidizing acid consisting essentially of (1) the reaction product of 1,3-dichloropropene and from 0.5 to 2.0 molar equivalents of a salt of hydrosulfuric acid selected from the group consisting of the alkali metal and ammonium salts, contacted at from 60° to 140° C., in combination with (2) an effective amount of a dispersing agent for dispersing said reaction product in an aqueous non-oxidizing acid.

2. An aqueous solution of a non-oxidizing acid containing, as a corrosion inhibitor therefor, from 0.5 to 1.2% by volume of the composition of claim 1.

3. An aqueous non-oxidizing acid solution containing, as the corrosion inhibitor therefor, from 0.5 to 1.2% by volume of the reaction product of 1,3-dichloropropene and from 0.5 to 2.0 molar equivalents of a salt of hydrosulfuric acid selected from the group consisting of alkali metal and ammonium salts, contacted at a temperature of from 60° to 140° C.

4. An aqueous non-oxidizing acid solution as set forth in claim 3 wherein said inhibitor is the residue obtained after substantially all components having boiling points below about 40° C. at about 2.0 mm. pressure are removed from the reaction product.

References Cited in the file of this patent

UNITED STATES PATENTS

| 1,805,052 | Sebrell | May 12, 1931 |
| 1,912,962 | Baer | June 6, 1933 |
| 2,100,968 | Lilienfeld | Nov. 30, 1937 |
| 2,209,440 | Adams et al. | July 30, 1940 |
| 2,814,593 | Beiswanger et al. | Nov. 26, 1957 |